United States Patent
Sang et al.

(10) Patent No.: US 9,329,324 B2
(45) Date of Patent: May 3, 2016

(54) REFLECTING COMPONENT AND BACKLIGHT COMPRISING THE SAME

(71) Applicant: BEIJING BOE OPTOELECTRONICS TECHNOLOGY CO., LTD., Beijing (CN)

(72) Inventors: Jian Sang, Beijing (CN); Haiwei Sun, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/103,637

(22) Filed: Dec. 11, 2013

(65) Prior Publication Data

US 2014/0198529 A1 Jul. 17, 2014

(30) Foreign Application Priority Data

Jan. 11, 2013 (CN) .......................... 2013 1 0011746

(51) Int. Cl.
| | |
|---|---|
| *F21V 7/04* | (2006.01) |
| *F21V 8/00* | (2006.01) |
| *G02B 27/00* | (2006.01) |
| *G02B 1/14* | (2015.01) |
| *G02B 1/18* | (2015.01) |
| *G02F 1/1335* | (2006.01) |

(52) U.S. Cl.
CPC ................ *G02B 6/0033* (2013.01); *G02B 1/14* (2015.01); *G02B 1/18* (2015.01); *G02B 6/0055* (2013.01); *G02B 27/0006* (2013.01); *G02F 1/133605* (2013.01)

(58) Field of Classification Search
CPC ............ G02B 1/10; G02B 1/105; G02B 1/11; G02B 1/14; G02B 5/08; G02B 6/0055; G02B 1/18; G02B 27/0006; G02F 1/133605
See application file for complete search history.

(56) References Cited

U.S. PATENT DOCUMENTS

| | | | |
|---|---|---|---|
| 6,913,365 B2 * | 7/2005 | Masaki et al. ................ 362/627 |
| 2005/0030630 A1 | 2/2005 | Ohnishi et al. | |
| 2006/0072436 A1 * | 4/2006 | Mizushima et al. ....... 369/275.1 |
| 2006/0126344 A1 | 6/2006 | Ueda et al. | |
| 2007/0014127 A1 * | 1/2007 | Hara et al. .................... 362/611 |
| 2007/0030574 A1 | 2/2007 | Watanabe | |

(Continued)

FOREIGN PATENT DOCUMENTS

| | | |
|---|---|---|
| CN | 1549949 A | 11/2004 |
| CN | 1791811 A | 6/2006 |

(Continued)

OTHER PUBLICATIONS

Third Office Action issued by the Chinese Patent Office for Chinese Patent Application No. 201310011746.8 dated Jul. 18, 2014, 4pgs.

(Continued)

*Primary Examiner* — Y M Lee

(57) ABSTRACT

Embodiments of the present invention disclose a reflecting component and a backlight comprising the same. The reflecting component comprises a reflective layer and a first protective layer provided on the reflective layer, wherein the surface of the first protective layer away from the reflective layer is formed to have one or more recessed structures.

9 Claims, 2 Drawing Sheets

(56) References Cited

U.S. PATENT DOCUMENTS

2008/0151549 A1 6/2008 Hsu
2008/0272697 A1* 11/2008 Cha et al. .................. 313/582
2012/0314450 A1 12/2012 Sakaguchi et al.

FOREIGN PATENT DOCUMENTS

| CN | 1871122 A | 11/2006 |
| CN | 101782215 A | 7/2010 |
| CN | 101929655 A | 12/2010 |
| CN | 102713692 A | 10/2012 |
| KR | 1020060094632 A | 8/2006 |
| WO | WO 2005019880 A1 * | 3/2005 |

OTHER PUBLICATIONS

English translation of Third Office Action issued by the Chinese Patent Office for Chinese Patent Application No. 201310011746.8 dated Jul. 18, 2014, 4pgs.
Rejection Decision issued by the Chinese Patent Office for Chinese Patent Application No. 201310011746.8 dated Jan. 6, 2015, five (5) pages.
English translation of Rejection Decision issued by the Chinese Patent Office for Chinese Patent Application No. 201310011746.8 dated Jan. 6, 2015, six (6) pages.
English abstract of CN1549949A; two (2) pages.
English abstract of CN1871122A; two (2) pages.
English abstract of CN101929655A; two (2) pages.
First Office Action issued by State Intellectual Property Office of People's Republic of China, in Chinese patent application No. 201310011746.8, dated Aug. 30, 2013, 6 pages.
English translation of First Office Action issued by State Intellectual Property Office of People's Republic of China, in Chinese patent application No. 201310011746.8, dated Aug. 30, 2013, 4 pages.
Second Office Action issued by State Intellectual Property Office of People's Republic of China, in Chinese patent application No. 201310011746.8, dated Apr. 2, 2014, 6 pages.
English translation of Second Office Action issued by State Intellectual Property Office of People's Republic of China, in Chinese patent application No. 201310011746.8, dated Apr. 2, 2014, 4 pages.
English abstract of CN1791811A; 1 page.
English abstract of CN102713692A; 1 page.
English abstract of CN101782215A; 1 page.
English abstract of KR1020060094632A; 2 pages.

* cited by examiner

REFLECTING COMPONENT AND BACKLIGHT COMPRISING THE SAME

CROSS REFERENCE TO RELATED APPLICATIONS

This application claims priority from Chinese National Application No. 201310011746.8 filed on Jan. 11, 2013, the contents of which are incorporated herein by reference.

FIELD OF THE INVENTION

Embodiments of the present invention relate to a reflecting component and a backlight comprising the same.

BACKGROUND

Backlight is a separate device located behind a liquid crystal display panel, used to provide a surface light source for the liquid crystal panel. Therefore, lighting performance of a backlight will directly affect the display quality of a liquid crystal display device.

Backlight is mainly comprised of lighting tubes, a light guide plate and a reflecting component, etc, wherein the reflecting component provided on the lower surface of and the light guide plate are used to reflect light traveling toward the lower surface, within the light guide plate. An existing reflecting component is mainly composed of a first protective layer, a reflective layer and a second reflective layer, which are sequentially laminated. The upper surface of the first protective layer is located close to the lower surface of the light guide plate. The first and second protective layer is mainly used to protect and support the reflecting component. Specifically, the first and second protective layers can be made from PET (polyethylene terephthalate), or other polyester material.

During manufacturing a backlight, some foreign bodies undetectable by the naked eye, with a dimension less than 20 micrometers, will fall into the gap between the first protective layer and the light guide plate Since both the first protective layer and the light guide plate have smooth surfaces, when the backlight undergoes vibration, the foreign bodies existing between the first protective layer and the light guide plate will cause friction with the first protective layer and the light guide plate. As a result, the first protective layer and the light guide plate are scratched by the foreign bodies, producing undesirable scratches in the backlight, and bright line scratches or dot scratches on displayed images.

To avoid those undesirable scratches caused by the foreign bodies in the backlight, a existing design is proposed, wherein tiny and soft protrusions are provided on the contact surface between the upper surface of the first protective layer and the lower surface of the light guide plate, so as to reduce the contact area between the upper surface of the first protection layer and the lower surface of the light guide plate, hence reducing the areas of the first protective layer and the light guide plate to be scratched by the foreign bodies.

However, because those protrusions tend to fall off under lager friction, and become foreign bodies between the first protective layer and the light guide plate, hence unexpectedly increasing the risk of scratches between the first protective layer and the light guide plate, as well as the risk of scratches on the backlight.

SUMMARY

An embodiment of the present invention provides a reflecting component for backlight, comprising a reflective layer and a first protective layer provided on the reflective layer, wherein the surface of the first protective layer away from the reflective layer is formed to have one or more recessed structures.

In an example, the one or more recessed structures are strip-shaped recessed grooves.

In an example, the recessed groove has a cylindrical inner surface.

In an example, the plural recessed grooves are parallel to each other.

In an example, the height of the recessed groove is 25 to 25 micrometers, and the opening width of the recessed groove is 40 to 60 micrometers.

In an example, the recessed structures are recessed pits.

In an example, the one or more recessed pits have a semi-spherical surface inner surface.

In an example, the height of the recessed pit is 20 to 25 micrometers, and the opening diameter of the recessed pit is 40 to 60 micrometers.

In an example, the reflecting component further comprises a second protective layer provided on the side of the reflective layer opposite to the first protective layer.

Another embodiment of the present invention provides a backlight comprising a light guide plate and the reflecting component described above, wherein the surface of the first protective layer having the one or more recessed structures formed thereon is disposed close to the light guide plate.

BRIEF DESCRIPTION OF THE DRAWINGS

In order to clearly illustrate the technical solutions of embodiments of the present invention, in the following, the accompanying drawings of the embodiments and existing technologies will be described briefly; it is obvious that the following description of the drawings only relates to some embodiments of the invention and thus not limitative of the invention.

DETAILED DESCRIPTION OF EMBODIMENTS

In connection with the accompanying drawings related to the embodiments of the present invention, the technical solutions of the embodiments will be described in a clear and fully understandable way; it is obvious that the described embodiments are just one part but not all of the embodiments of the invention. Other embodiment(s) obtained by those skilled in the art, based on the embodiments of the present invention, without any inventive work, all belong to the protection scope of the present invention.

One of the technical problems to be solved by embodiments of the present invention is to provide a reflecting component to reduce the risk of undesirable scratches on the reflecting component and the light guide plate caused by foreign bodies existing between the reflecting component and the light guide plate.

Figure 1:
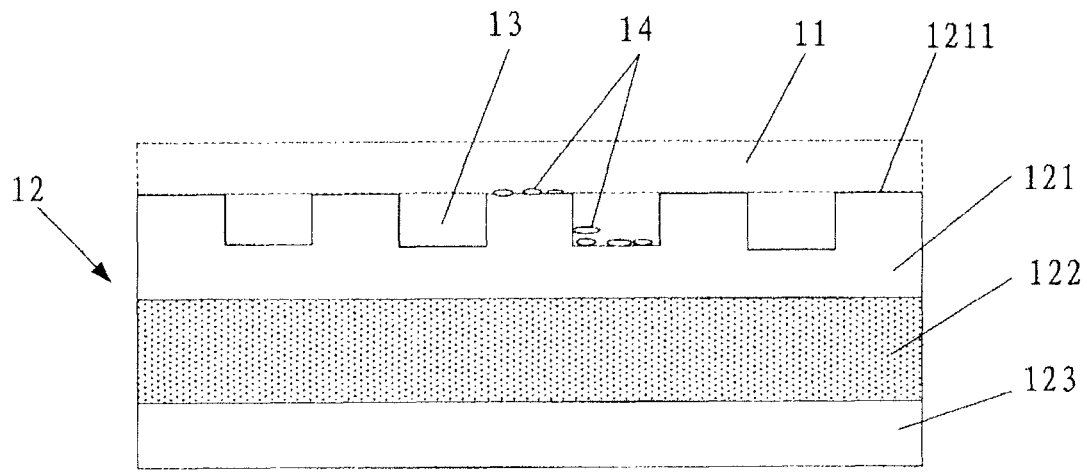
FIG. 1 is a schematic side cross sectional view of the reflecting component provided by a first embodiment of the present invention.

As shown in FIG. 1, the first embodiment of the present invention provides a reflecting component 12 for a backlight of a display device. The reflecting component 12 located close to the light guide plate 11 is used to reflect the light towards predetermined directions. The reflecting component 12 comprises, in the direction away from the light guide plate, a first protective layer 121, a reflective layer 122 and a second protective layer 123, wherein the upper surface 1211 of the first protective layer 121 is adjacent to the lower surface of the light guide plate 11. Recessed structures 13 are provided on the upper surface 1211 of the first protective layer 121.

In the reflecting component 12 in accordance with embodiments of the present invention, since the first protective layer 121 is provided with recessed structure 13, region of the upper surface of the first protective layer 121 capable of foaming a surface-to-surface contact with the lower surface of the light guide plate 11 is reduced. Given the existence of foreign bodies 14 between the first protective layer 121 and the light guide plate 11, when the backlight (not shown in FIG. 1) undergoes vibration, the region subjected to friction between the foreign bodies 12 and the reflecting component 11 and the light guide plate 11 is reduced. Moreover, since the foreign bodies 14 existing between the first protective layer 121 of the reflecting component 12 and the light guide plate 11 will can fall into the recessed structures 13 and store up there during the vibration, the amount of foreign bodies 14 existing between the reflecting component 12 and light guide plate 11 is reduced, hence considerably reducing the risk of undesirable scratches on the reflecting component 12 and the light guide plate 11.

In the reflecting component 12 provided by the above embodiment, the recessed structures 13 can be strip-shaped recessed grooves 21 with square cross-section. Since the recessed grooves 21 is capable of accommodating the foreign bodies 14, the foreign bodies 14 existing between the first protective layer 121 of the reflecting component 12 and the light guide plate 11 can fall into the recessed grooves 21 with the vibration of the backlight.

Figure 2:
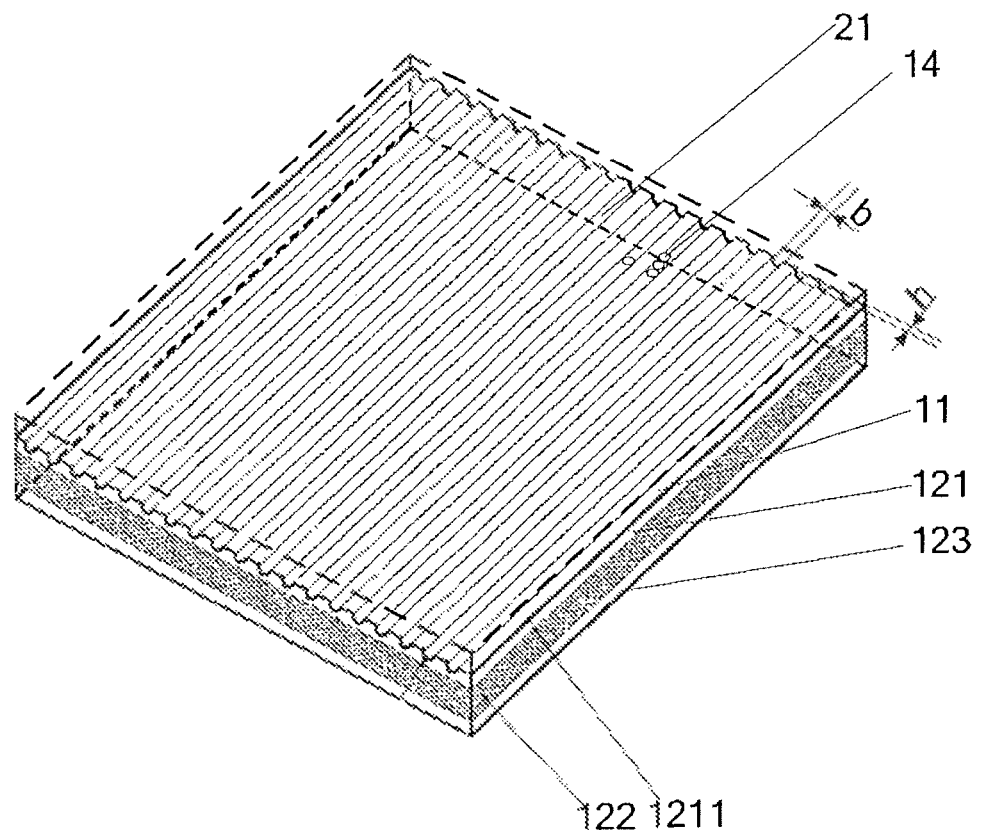
FIG. 2 is a schematic diagram of the reflecting component provided by a second embodiment of the present invention.

A second embodiment of the present invention provides a reflecting component, as shown in FIG. 2. The main difference between the reflecting component provided by the second embodiment and the reflecting component provided by the first embodiment lies in that: the recessed groove 21 formed on the upper surface 1211 of the first protective layer 121 of the reflecting component provided by the second embodiment have a cylindrical inner surface. As the cylindrical surface facilitates the rolling of objects, the foreign bodies 14 can easily fall into the recessed grooves 21 along the cylindrical inner surface.

In the reflecting component provided by the above embodiments, there can be a plurality of the recessed grooves 21. These recessed grooves 21 are used to store up a greater amount of foreign bodies 14, and greatly reduce the region of the upper surface 1211 of the first protection layer 121 of the reflecting component 12 capable of forming a surface-to-surface contact with the lower surface of the light guide plate 11. Accordingly, the risk of undesirable scratches on the first protective layer 121 of the reflecting component 12 and the light guide plate 11 by the foreign bodies 14 can be considerably reduced.

In the reflecting component provided by the above embodiments, the plurality of recessed grooves on the first protective layer 121 can be formed to be parallel to each other, so that the foreign bodies 14 can easily fall into the recessed grooves, when the backlight undergoes vibration.

The dimension of the foreign bodies 14 is usually less than 20 micrometers. In an example, as shown in FIG. 2, the height of the recessed grooves 21 can be 20 to 25 micrometers, and the opening width of the recessed grooves can be 40 to 60 micrometers. In addition, the recessed grooves 21 each has two opens end in the longitudinal direction. Therefore, the recessed grooves 21 can not only store up the foreign bodies 14, but also facilitate a rapid discharge of the foreign bodies 14 from the recessed grooves 21.

Figure 3:
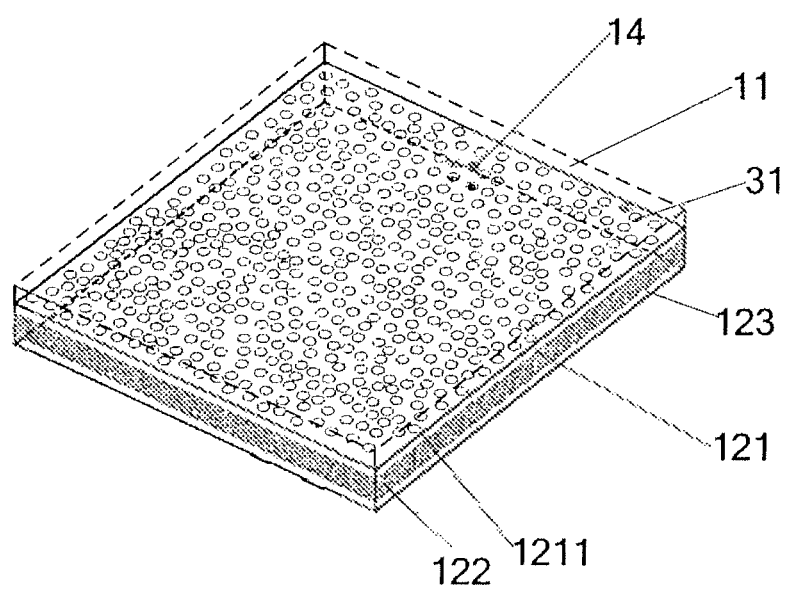
FIG. 3 is a schematic diagram of the reflecting component provided by a third embodiment of the present invention.

A third embodiment provides a reflecting component, as shown in FIG. 3. The major difference between the reflecting component provided by the third embodiment and the reflecting component provided by the first embodiment lies in that that: the recessed structures formed on the upper surface 1211 of the first protective layer 121 of the reflecting component provided by the third embodiment can be recessed pits 31, as shown in FIG. 3. Since the recessed pits 31 are capable of accommodating a large amount of foreign bodies 14, the foreign bodies 14 existing between the first protective layer 121 of the reflecting component 12 and the light guide plate 11 can fall into the recessed pits 31 when the backlight undergoes vibration.

In an example, the recessed pit 31 has a semi-spherical surface inner surface so that the foreign bodies 14 can easily fall into the recessed pits 31 along the semi-spherical surface inner surface.

In an example, there can be a plurality of recessed pits 31. The plurality of the recessed grooves 31 can store up a greater amount of foreign bodies 14, and greatly reduce region of the upper surface of the first protection layer 121 of the reflecting component 12 capable of forming a surface-to-surface contact with the lower surface of the light guide plate 11. As a result, the risk of undesirable scratches on the reflecting component 12 and the light guide plate 11 by the foreign bodies 14 can be considerably reduced.

In an example, the plurality of recessed pits are irregularly arranged, so that light entering into the recessed pits 31, due to light scattering effect, can be more uniformly reflecting back, resulting in a better distribution uniformity of light reflected from the reflecting component 12.

The dimension of the foreign bodies 14 is generally less than 20 micrometers. In an example, the height of the recessed pits 31 can be 20 to 25 micrometers, the opening diameter of the recessed pits 31 can be 40 to 60 micrometers, so that the recessed pits 31 can not only store up the foreign bodies 14, but also facilitate the scattering of the light arrived at the reflecting component 12, hence improving distribution uniformity of light reflected from the reflecting component 12.

An embodiment of the present invention also provide a backlight comprising a light guide plate and a reflecting component provided by the embodiments of the present invention, wherein the recessed structure is formed on a surface of the first protective layer close to the light guide plate.

In the backlight in accordance with the embodiment of the present invention, the surface-to-surface contact region between the upper surface of the first protective layer and the lower surface of the light guide plate is reduced, by using the reflecting component having a recessed structure formed on the surface of its first protective layer close to the light guide plate as described in the above embodiments, hence considerably reducing the risk of undesirable scratches on the reflecting component and the light guide plate by the foreign bodies existing between the first protective layer of the reflecting component and the light guide plate, which in turn reduces the probability of non-uniform illumination of the backlight.

In the reflecting component and the backlight comprising the same in accordance with embodiments of the present invention, since recessed structures are provided on the upper surface of the first protective layer of the reflecting component, the regions of the upper surface of the first protective layer and the lower surface of the light guide plate capable of forming a surface-to-surface contact therebetween is reduced. As a result, when the backlight undergoes vibration, the area of the reflecting component and the light guide plate, subjected to friction caused by the foreign bodies existing between the reflecting component and the light guide plate, is reduced. Moreover, the foreign bodies existing between the first protective layer of the reflecting component and the light guide plate can fall into the recessed structures with the vibration of the backlight. Since the foreign bodies 14 can be stored up in the recessed structures, the amount of foreign bodies existing in the region of the first protective layer of the reflecting component capable of forming surface-to-surface contact with the light guide plate is reduced, hence considerably reducing the risk of undesirable scratches on the reflecting component and the light guide plate.

Although the present invention has been described in considerable detail with reference to preferred embodiments thereof, some modifications or improvements can still be made on the basis of the present invention, which is evident to those skilled in the art. Therefore, those modifications or improvements, which are made without departing from the spirit of the present invention, all belong to the protection scope of the present invention.

What is claimed is:

1. A reflecting component for backlight, comprising a reflective layer and a first protective layer provided on the reflective layer, wherein the surface of the first protective layer away from the reflective layer is formed to have plural recessed structures, wherein at the surface of the first protective layer away from the reflective layer, a portion between adjacent recessed structures is flat, the plural recessed structures are strip-shaped recessed grooves, the height of the recessed groove is 20 to 25 micrometers and the opening width of the recessed groove is 40 to 60 micrometers.

2. The reflecting component according to claim 1, wherein the recessed groove has a cylindrical inner surface.

3. The reflecting component according to claim 1, wherein the plural recessed grooves are parallel to each other.

4. The reflecting component according to claim 1, further comprising a second protective layer provided on the side of the reflective layer opposite to the first protective layer.

5. A backlight comprising a light guide plate and the reflecting component according to claim 1, wherein the surface of the first protective layer having the plural recessed structures formed thereon is disposed close to the light guide plate.

6. A reflecting component for backlight, comprising a reflective layer and a first protective layer provided on the reflective layer, wherein the surface of the first protective layer away from the reflective layer is formed to have plural recessed structures, wherein at the surface of the first protective layer away from the reflective layer, a portion between adjacent recessed structures is flat, the recessed structures are recessed pits, the height of the recessed pit is 20 to 25 micrometers and the opening diameter of the recessed pit is 40 to 60 micrometers.

7. The reflecting component according to claim 6, wherein the plural recessed pits have a semi-spherical surface inner surface.

8. The reflecting component according to claim 6, further comprising a second protective layer provided on the side of the reflective layer opposite to the first protective layer.

9. A backlight comprising a light guide plate and the reflecting component according to claim 6, wherein the surface of the first protective layer having the plural recessed structures formed thereon is disposed close to the light guide plate.

* * * * *